US010647194B1

(12) United States Patent
Burtch

(10) Patent No.: US 10,647,194 B1
(45) Date of Patent: May 12, 2020

(54) MULTI-FUNCTION GRILL SHUTTER AND AIRFLOW GUIDE

(71) Applicants: DENSO International America, Inc., Southfield, MI (US); DENSO CORPORATION, Kariya, Aichi-pref. (JP)

(72) Inventor: Joseph Burtch, Novi, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/358,418

(22) Filed: Mar. 19, 2019

(51) Int. Cl.
*B60K 11/08* (2006.01)

(52) U.S. Cl.
CPC .................. *B60K 11/085* (2013.01)

(58) Field of Classification Search
CPC .................................................. B60K 11/085
USPC ................................................ 180/68.1, 68.3
See application file for complete search history.

(56) References Cited

U.S. PATENT DOCUMENTS

| | | | | |
|---|---|---|---|---|
| 4,457,558 A * | 7/1984 | Ishikawa | ............... | B60K 11/085 296/180.5 |
| 5,141,026 A * | 8/1992 | Collette | ............... | B60K 11/085 137/601.09 |
| 5,984,035 A * | 11/1999 | Katoh | .................... | B62K 11/04 180/229 |
| 6,405,819 B1 * | 6/2002 | Ohkura | .................. | B60K 11/08 180/68.1 |
| 8,091,516 B2 * | 1/2012 | Preiss | .................... | B60K 11/04 123/41.05 |
| 8,181,727 B2 * | 5/2012 | Ritz | ..................... | B60K 11/085 180/68.1 |
| 8,292,014 B2 * | 10/2012 | Sugiyama | ............ | B60K 11/085 123/41.06 |
| 8,469,128 B2 * | 6/2013 | Van Buren | ........... | B60K 11/085 165/44 |
| 8,517,130 B2 * | 8/2013 | Sakai | .................. | B60K 11/085 180/68.1 |
| 8,561,738 B2 * | 10/2013 | Charnesky | ........... | B60K 11/085 180/68.1 |
| 8,646,552 B2 * | 2/2014 | Evans | .................. | B60K 11/085 180/68.1 |
| 8,689,917 B2 * | 4/2014 | Miesterfeld | ............... | F01P 7/10 180/68.1 |
| 8,720,624 B2 * | 5/2014 | Remy | .................. | B60K 11/085 180/68.1 |
| 8,727,054 B2 * | 5/2014 | Hori | ..................... | B60K 11/085 165/41 |
| 8,794,360 B2 * | 8/2014 | Nemoto | ............... | B60K 11/085 180/68.1 |
| 8,794,363 B2 * | 8/2014 | Wolf | .................... | B60K 11/085 180/68.1 |
| 8,825,308 B2 * | 9/2014 | Nishimura | ........... | B60H 1/3208 180/68.1 |

(Continued)

*Primary Examiner* — Jeffrey J Restifo

(74) *Attorney, Agent, or Firm* — Harness, Dickey & Pierce, P.L.C.

(57) ABSTRACT

An active grill shutter assembly including a plurality of airflow control blades. At least two of the airflow control blades have different curvatures or chord lengths configured to optimize airflow over a curvature of an air duct that the active grill shutter is mounted in. An actuator is linked to the plurality of airflow control blades with a linkage assembly to rotate the plurality of airflow control blades.

20 Claims, 2 Drawing Sheets

(56) References Cited

U.S. PATENT DOCUMENTS

Figure 1:
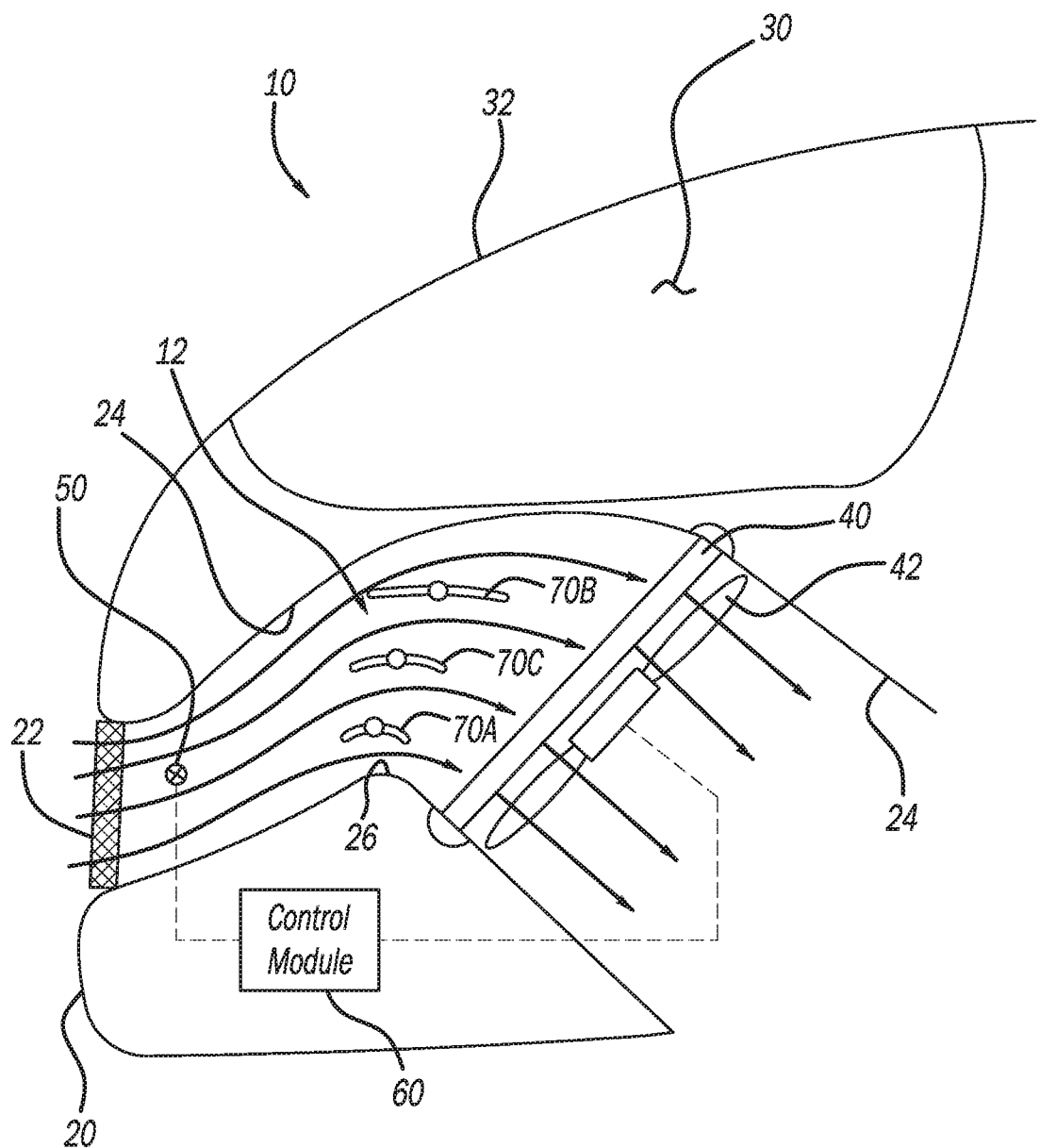

| | | | | |
|---|---|---|---|---|
| 8,833,498 B2* | 9/2014 | Charnesky | ................ | F01P 7/10 |
| | | | | 180/68.1 |
| 8,892,314 B2* | 11/2014 | Charnesky | ........... | B60K 11/085 |
| | | | | 180/68.1 |
| 8,915,320 B2* | 12/2014 | Chinta | ................ | B60K 11/085 |
| | | | | 180/68.1 |
| 8,983,735 B2* | 3/2015 | Konishi | ............... | B60K 11/085 |
| | | | | 123/41.04 |
| 9,670,824 B2* | 6/2017 | Sowards | ................... | F01P 7/10 |
| 9,744,847 B2* | 8/2017 | Anderson | ............ | B60K 11/085 |
| 9,827,847 B1* | 11/2017 | Hanna | ................ | B60H 1/00314 |
| 9,827,848 B1* | 11/2017 | Sangha | ................ | B60K 11/085 |
| 10,017,048 B2* | 7/2018 | Manhire | ............. | B60K 11/085 |
| 10,059,193 B2* | 8/2018 | Ayala | .................... | B60K 11/085 |
| 10,071,625 B1* | 9/2018 | Stoddard | ............. | B60K 11/085 |
| 10,150,362 B2* | 12/2018 | Wiech | ................... | B60K 11/04 |
| 10,214,095 B2* | 2/2019 | Kornhaas | ............. | B60K 11/04 |
| 10,323,852 B2* | 6/2019 | Takanaga | .................. | F24F 7/00 |
| 2012/0049664 A1* | 3/2012 | Yokoyama | ......... | B60H 1/00392 |
| | | | | 310/53 |
| 2017/0326969 A1* | 11/2017 | Ayala | .................... | B60K 11/085 |
| 2018/0022210 A1* | 1/2018 | Matsumura | ............ | B60K 11/04 |
| | | | | 123/41.05 |

* cited by examiner

MULTI-FUNCTION GRILL SHUTTER AND AIRFLOW GUIDE

FIELD

The present disclosure relates to a multi-function grill shutter and airflow guide.

BACKGROUND

This section provides background information related to the present disclosure, which is not necessarily prior art.

Many vehicles include active grill shutters to control the amount of airflow through the front grill, and thus improve the vehicle's drag coefficient during higher speed driving with low cooling demand. With respect to electric vehicles, some manufacturers have begun to locate a storage area in front of where the engine compartment used to be. As a result, the height of the cooling module must be reduced. One way to accomplish this is to arrange the heat exchanger at a severe back angle and use a duct to direct the airflow from the grill to the heat exchanger. However, such a packaging configuration results in reduced airflow quantity and distribution. This is because the duct must have a sharp turn where it attaches to the heat exchanger. The sharp turn undesirably causes uneven airflow distribution across the heat exchanger. The present disclosure includes an active grill shutter assembly that advantageously provides even airflow across the heat exchanger, and provides numerous additional advantages and unexpected results as explained herein and as one skilled in the art will recognize.

SUMMARY

This section provides a general summary of the disclosure, and is not a comprehensive disclosure of its full scope or all of its features.

The present disclosure includes an active grill shutter assembly having a plurality of airflow control blades. At least two of the airflow control blades have different curvatures or chord lengths configured to optimize airflow over a curvature of an air duct that the active grill shutter is mounted in. An actuator is linked to the plurality of airflow control blades with a linkage assembly to rotate the plurality of airflow control blades.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 2:
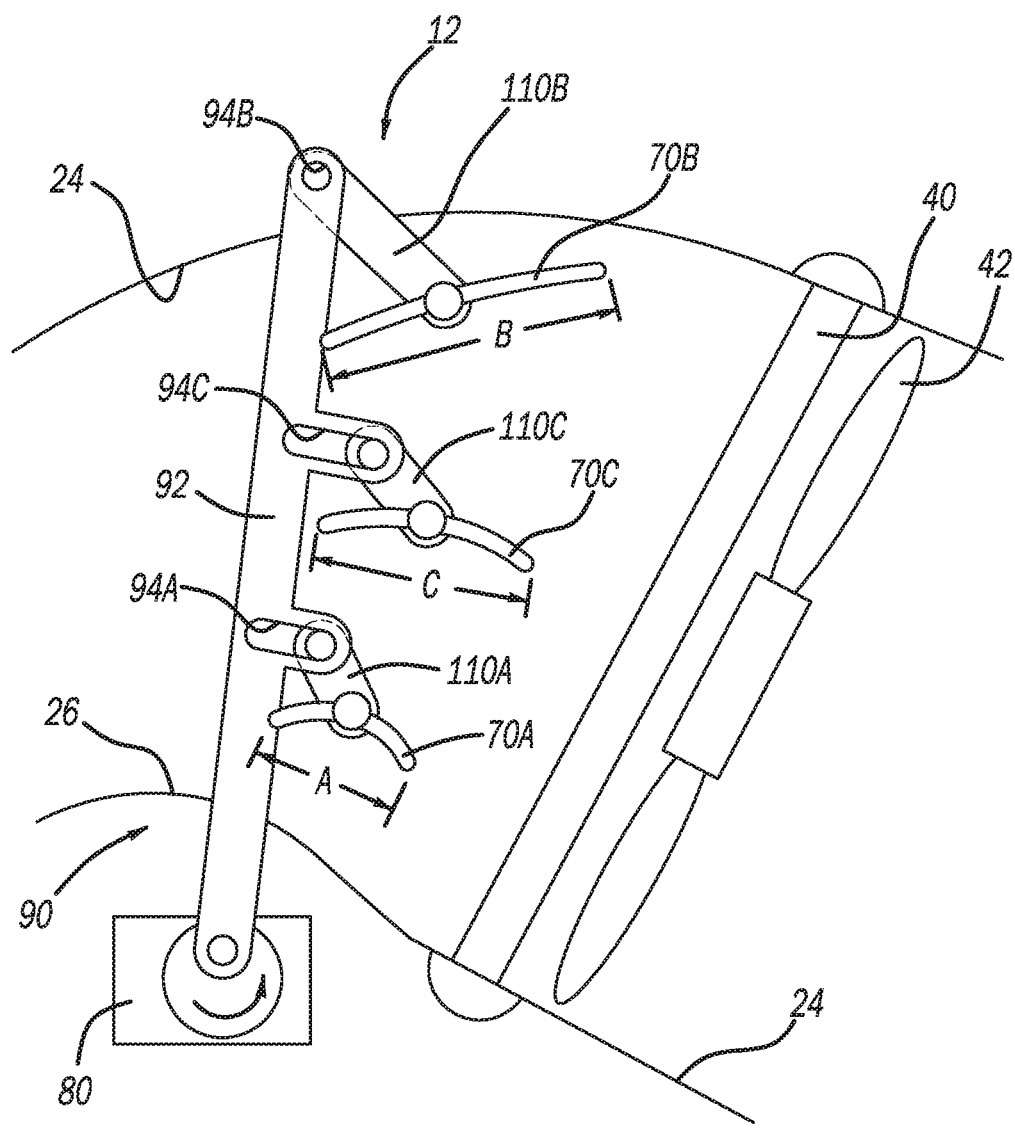

FIG. 1 illustrates a front end of a vehicle including an active grill shutter assembly in accordance with the present disclosure; and FIG. 2 illustrates the active grill shutter assembly of FIG. 1 in greater detail.

Corresponding reference numerals indicate corresponding parts throughout the several views of the drawings.

DETAILED DESCRIPTION

Example embodiments will now be described more fully with reference to the accompanying drawings.

FIG. 1 illustrates an exemplary vehicle 10 including an active grill shutter assembly 12 in accordance with the present disclosure. The vehicle 10 may be any suitable vehicle, such as any suitable passenger vehicle, mass transit vehicle, recreational vehicle, utility vehicle, construction vehicle/equipment, military vehicle/equipment, watercraft, etc. The active grill shutter assembly 12 may be included with any suitable non-vehicular application as well.

The exemplary vehicle 10 includes a front bumper 20. Proximate to the front bumper 20 is a front grill 22, which is at an opening of an air duct 24. The air duct 24 extends inward from the front of the vehicle 10. The air duct 24 is curved along its length at an air duct curvature 26. Above the air duct 24 is a storage space (or trunk) 30. A hood 32 covers the storage space 30.

Arranged within the air duct 24 on a side of the air duct curvature 26 opposite to the grill 22 is a heat exchanger 40 and a fan 42. The heat exchanger 40 may be any suitable heat exchanger, such as a condenser. The fan 42 is any suitable airflow generation device configured to generate airflow through the air duct 24 and across the heat exchanger 40. Also arranged within the air duct 24 is any suitable air speed measurement device, such as an anemometer 50. The anemometer 50 may be arranged at any suitable position along the duct 24.

A control module 60 is in receipt of input signals from the anemometer 50 and the fan 42. From the anemometer 50 the control module 60 receives signals representing the air speed of airflow flowing through the duct 24. From the fan 42 the control module 60 receives signals identifying the rotational speed of the fan 42.

In this application, including the definitions below, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module 60 described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

With continued reference to FIG. 1, and additional reference to FIG. 2, the active grill shutter assembly 12 will now be described in additional detail. The active grill shutter assembly 12 includes a plurality of airflow control blades. Any suitable number of airflow control blades may be included. In the example illustrated, three airflow control blades are included: a first airflow control blade 70A; a second airflow control blade 70B; and a third airflow control blade 70C. The first blade 70A is arranged closest to the air duct curvature 26. The second blade 70B is arranged furthest from the air duct curvature 26. The third blade 70C is arranged between the first blade 70A and the second blade 70B. The plurality of airflow control blades 70A, 70B, 70C extend across the air duct 24 such that a length of the plurality of airflow control blades 70A, 70B, 70C extends perpendicular to, or generally perpendicular to, the flow of air through the air duct 24. The plurality of airflow control blades 70A, 70B, 70C are mounted within the air duct 24 in any suitable manner, such as on rods that extend across the air duct 24.

The airflow control blades 70A-70C are actuated by any suitable actuator 80. In some applications, the actuator 80 may be a servo. The actuator 80 receives inputs from the control module 60 that control operation of the actuator 80. The actuator 80 actuates the airflow control blades 70A-70C by way of a linkage assembly 90. The linkage assembly 90 includes a rod 92, which is connected to the actuator 80. Actuation of the actuator 80 moves the rod 92. The rod 92 includes a plurality of couplings, such as a first coupling 94A, a second coupling 94B, and a third coupling 94C. In the example illustrated, the first coupling 94A and the third coupling 94C each define a slot. The second coupling 94B may define a slot in some applications, but does not in the example illustrated.

The linkage assembly 90 further includes a first linkage 110A, a second linkage 110B, and a third linkage 110C. The first linkage 110A connects the first blade 70A to the first coupling 94A. The second linkage 110B connects the second blade 70B to the second coupling 94B. The third linkage 110C connects the third blade 70C to the third coupling 94C. The first linkage 110A is shorter than each of the second linkage 110B and the third linkage 110C. The second linkage 110B is longer than each of the first linkage 110A and the third linkage 110C. The third linkage 110C is longer than the first linkage 110A, and shorter than the second linkage 110B.

Each one of the plurality of airflow control blades 70A-70C is curved along its chord length A, B, C. The first blade 70A is curved more than each one of the second blade 70B and the third blade 70C. The second blade 70B is curved less than the first blade 70A and the third blade 70C. The third blade 70C is curved less than the first blade 70A, and curved more than the second blade 70B.

The first blade 70A has a chord length A, which is shorter than a cord length B of the second blade 70B and shorter than a chord length C of the third blade 70C. The chord length B of the second blade 70B is longer than the chord length A and the chord length C. The chord length C is longer than the chord length A and shorter than the chord length B. The degree of curvature and the chord lengths A, B, C of the blades 70A, 70B, 70C can be customized based on the application (such as the length and width of the air duct 24, the position of the air duct curvature 26, and the position of the heat exchanger 40, for example) to optimize airflow across the heat exchanger 40.

Actuation of the linkage assembly 90 by the actuator 80 results in the first blade 70A being rotated further than each one of the second blade 70B and the third blade 70C because the first linkage 110A is shorter than each one of the second and third linkages 110B and 110C. Actuation of the rod 92 results in the second blade 70B rotating less than each one of the first blade 70A and the third blade 70C because the second linkage 110B is longer than the first linkage 110A and the third linkage 110C. Actuation of the rod 92 results in the third blade 70C rotating less than the first blade 70A and more than the second blade 70B because the third linkage 110C is longer than the first linkage 110A and shorter than the second linkage 110B. Thus the degree of rotation of each one of the blades 70A-70C is directly proportional to the length of their respective linkages 110A-110C. In general, the longer the linkage 110A-110C, the less rotation of the blades 70A-70C. Thus the length of the linkages 110A-110C can be customized to optimize the position of each one of the blades 70A-70C to evenly distribute airflow across the heat exchanger 40.

The control module 60 advantageously activates the actuator 80 to angle the blades 70A, 70B, and 70C based on the speed of the fan 42 and the speed of airflow through the air duct 24 as measured by the anemometer 50 to produce optimal airflow distribution and uniform flow across the heat exchanger 40, which directly corresponds to speed of the vehicle 10 and the speed of the fan 42. The present disclosure thus advantageously provides for an active grill shutter assembly 12 that provides optimal, uniform airflow across the heat exchanger 40 even though the heat exchanger 40 is downstream of the air duct curvature 26, which disrupts airflow flowing across the curvature 26. The present disclosure is thus an improvement over existing active grill shutter assemblies, which are typically arranged closer to the front grill 22 and are unable to compensate for the airflow disruption and uneven airflow across the heat exchanger 40 caused by the air duct curvature 26. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An active grill shutter assembly comprising:
    a plurality of airflow control blades each including an upper surface and a lower surface that is opposite to, and shorter than, the upper surface, each one of the upper surface and the lower surface is continuously curved from an upstream end to a downstream end relative to airflow across the plurality of airflow control blades, at least two of the plurality of airflow control blades have different curvatures and chord lengths configured to optimize airflow over a curvature of an air duct that the active grill shutter is mounted in; and
    an actuator linked to the plurality of airflow control blades with a linkage assembly to rotate the plurality of airflow control blades.

2. The active grill shutter assembly of claim 1, wherein:
    the plurality of airflow control blades include a first airflow control blade having a first curvature, a second airflow control blade having a second curvature, and a third airflow control blade having a third curvature;
    the first airflow control blade is closest to the curvature of the air duct, the second airflow control blade is furthest from the curvature of the air duct, and the third airflow control blade is between the first and the second airflow control blades; and
    the first curvature of the first airflow control blade is greater than the second curvature of the second airflow control blade.

3. The active grill shutter assembly of claim 2, wherein the first curvature of the first airflow control blade is greater than the third curvature of the third airflow control blade;
    the third curvature of the third airflow control blade is less than the first curvature of the first airflow control blade; and
    the third curvature of the third airflow control blade is greater than the second curvature of the second airflow control blade.

4. The active grill shutter assembly of claim 1, wherein:
    the plurality of airflow control blades include a first airflow control blade having a first chord length, a second airflow control blade having a second chord length, and a third airflow control blade having a third chord length;
    the first airflow control blade is closest to the curvature of the air duct, the second airflow control blade is furthest from the curvature of the air duct, and the third airflow control blade is between the first and the second airflow control blades; and
    the first chord length of the first airflow control blade is less than the second chord length of the second airflow control blade.

5. The active grill shutter assembly of claim 4, wherein the first chord length of the first airflow control blade is less than the third chord length of the third airflow control blade; and
    the third chord length of the third airflow control blade is less than the second chord length of the second airflow control blade.

6. The active grill shutter assembly of claim 1, wherein the linkage assembly includes:
    a rod connected to the actuator such that the rod is movable by the actuator;
    a first linkage connecting the rod to the first airflow control blade;
    a second linkage connecting the rod to the second airflow control blade; and
    a third linkage connecting the rod to the third airflow control blade;
    wherein the first linkage is shorter than the second linkage.

7. The active grill shutter assembly of claim 6, wherein the third linkage is longer than the first linkage and shorter than the third linkage.

8. The active grill shutter assembly of claim 7, wherein:
    actuation of the rod by the actuator rotates the first airflow control blade a greater distance than each one of the second airflow control blade and the third airflow control blade; and
    actuation of the rod by the actuator rotates the third airflow control blade a greater distance than the second airflow control blade and a shorter distance than the first airflow control blade.

9. The active grill shutter assembly of claim 6, wherein each one of the first linkage and the second linkage is slidably received within a different coupling slot defined by the rod.

10. An active grill shutter assembly comprising:
    a plurality of airflow control blades each including an upper surface and a lower surface that is opposite to, and shorter than, the upper surface, each one of the upper surface and the lower surface is continuously curved from an upstream end to a downstream end relative to airflow across the plurality of airflow control blades, at least two of the plurality of airflow control blades have different curvatures and chord lengths configured to optimize airflow over a curvature of an air duct that the active grill shutter is mounted in;

an actuator linked to the plurality of airflow control blades with a linkage assembly to rotate the plurality of airflow control blades;

an anemometer configured to measure air speed of airflow passing through the air duct; and a control module connected to the anemometer to receive the air speed and connected to a fan within the air duct to receive fan speed of the fan, the control module configured to operate the actuator to rotate the plurality of airflow control blades a predetermined degree based on the air speed and the fan speed to direct airflow evenly across a heat exchanger arranged in the air duct.

11. The active grill shutter assembly of claim 10, wherein the plurality of airflow control blades are configured to be arranged at the curvature of the air duct.

12. The active grill shutter assembly of claim 10, wherein:
the plurality of airflow control blades include a first airflow control blade having a first curvature, a second airflow control blade having a second curvature, and a third airflow control blade having a third curvature;
the first airflow control blade is closest to the curvature of the air duct, the second airflow control blade is furthest from the curvature of the air duct, and the third airflow control blade is between the first and the second airflow control blades; and
the first curvature of the first airflow control blade is greater than the second curvature of the second airflow control blade.

13. The active grill shutter assembly of claim 12, wherein the first curvature of the first airflow control blade is greater than the third curvature of the third airflow control blade;
the third curvature of the third airflow control blade is less than the first curvature of the first airflow control blade; and
the third curvature of the third airflow control blade is greater than the second curvature of the second airflow control blade.

14. The active grill shutter assembly of claim 10, wherein:
the plurality of airflow control blades include a first airflow control blade having a first chord length, a second airflow control blade having a second chord length, and a third airflow control blade having a third chord length;
the first airflow control blade is closest to the curvature of the air duct, the second airflow control blade is furthest from the curvature of the air duct, and the third airflow control blade is between the first and the second airflow control blades; and
the first chord length of the first airflow control blade is less than the second chord length of the second airflow control blade.

15. The active grill shutter assembly of claim 14, wherein the first chord length of the first airflow control blade is less than the third chord length of the third airflow control blade; and
the third chord length of the third airflow control blade is less than the second chord length of the second airflow control blade.

16. The active grill shutter assembly of claim 10, wherein the linkage assembly includes:
a rod connected to the actuator such that the rod is movable by the actuator;
a first linkage connecting the rod to the first airflow control blade;
a second linkage connecting the rod to the second airflow control blade; and
a third linkage connecting the rod to the third airflow control blade;
wherein the first linkage is shorter than the second linkage.

17. The active grill shutter assembly of claim 16, wherein the third linkage is longer than the first linkage and shorter than the third linkage.

18. The active grill shutter assembly of claim 17, wherein actuation of the rod by the actuator rotates the first airflow control blade a greater distance than each one of the second airflow control blade and the third airflow control blade.

19. The active grill shutter assembly of claim 18, wherein actuation of the rod by the actuator rotates the third airflow control blade a greater distance than the second airflow control blade and a shorter distance than the first airflow control blade.

20. An active grill shutter assembly comprising:
a plurality of airflow control blades, at least two of the plurality of airflow control blades have different curvatures or chord lengths configured to optimize airflow over a curvature of an air duct that the active grill shutter is mounted in; and
an actuator linked to the plurality of airflow control blades with a linkage assembly to rotate the plurality of airflow control blades;
wherein the linkage assembly includes:
rod connected to the actuator such that the rod is movable by the actuator;
a first linkage connecting the rod to the first airflow control blade;
a second linkage connecting the rod to the second airflow control blade, the first linkage is shorter than the second linkage; and
a third linkage connecting the rod to the third airflow control blade, the third linkage is longer than the first linkage and shorter than the third linkage.

* * * * *